United States Patent
Jia et al.

(10) Patent No.: US 7,778,311 B2
(45) Date of Patent: Aug. 17, 2010

(54) BIT SYNCHRONIZATION FOR WEAK NAVIGATIONAL SATELLITE SIGNALS

(75) Inventors: Zhike Jia, San Jose, CA (US); Chi-Shin Wang, Los Altos Hills, CA (US)

(73) Assignee: SIRF Technology Holdings, Inc., San Jose, CA (US)

(*) Notice: Subject to any disclaimer, the term of this patent is extended or adjusted under 35 U.S.C. 154(b) by 866 days.

(21) Appl. No.: 11/244,305

(22) Filed: Oct. 4, 2005

(65) Prior Publication Data

US 2007/0076788 A1  Apr. 5, 2007

(51) Int. Cl.
*H04B 1/00* (2006.01)
(52) U.S. Cl. .................................................. 375/150
(58) Field of Classification Search ................ 375/150, 375/316, 324; 370/335; 455/63.4, 67.11
See application file for complete search history.

(56) References Cited

U.S. PATENT DOCUMENTS

| | | | |
|---|---|---|---|
| 4,701,934 A | 10/1987 | Jasper | 375/1 |
| 4,821,294 A | 4/1989 | Thomas, Jr. | 375/96 |
| 5,768,319 A | 6/1998 | Durboraw, III | 375/316 |
| 6,028,886 A * | 2/2000 | Koga et al. | 375/133 |
| 6,407,699 B1 | 6/2002 | Yang | 342/357.12 |
| 6,683,923 B1 | 1/2004 | Butts, Jr. | 375/343 |
| 6,933,886 B1 | 8/2005 | Sahai et al. | 342/357.15 |
| 7,251,455 B1 * | 7/2007 | Mower et al. | 455/63.4 |
| 7,460,835 B1 * | 12/2008 | Petrus | 455/67.11 |
| 2002/0009064 A1 * | 1/2002 | Blessent et al. | 370/335 |
| 2003/0147457 A1 * | 8/2003 | King et al. | 375/148 |
| 2003/0227963 A1 | 12/2003 | Dafesh | 375/149 |
| 2004/0141549 A1 * | 7/2004 | Abraham et al. | 375/150 |
| 2008/0112469 A1 * | 5/2008 | Goldberg et al. | 375/150 |

* cited by examiner

*Primary Examiner*—David C Payne
*Assistant Examiner*—Leon-Viet Q Nguyen
(74) *Attorney, Agent, or Firm*—Mark J. Danielson; Pillsbury Winthrop Shaw Pittman LLP (57) ABSTRACT

Methods to achieve data bit synchronization from weak navigational satellite signals are based on a maximum likelihood criterion. The bit synchronization technique may be implemented by calculating a normalized dot product of two consecutive one-millisecond correlation values. Similar normalized dot products are calculated at intervals separated by one bit duration, and these dot products are summed and compared with pre-computed thresholds to declare bit edge detection. In another implementation, the normalized dot product of adjacent correlation values is replaced by a coherent integration powers of adjacent correlation values.

21 Claims, 5 Drawing Sheets

BIT SYNCHRONIZATION FOR WEAK NAVIGATIONAL SATELLITE SIGNALS

FIELD OF THE INVENTION

The present invention relates generally to navigational signal receivers. More specifically, it relates to techniques for navigation data bit synchronization from the received weak navigational satellite ranging signals.

BACKGROUND OF THE INVENTION

The global positioning system (GPS) is a satellite-based radio-navigation system built and operated by the United States Department of Defense. The system uses twenty-four satellites orbiting the earth at an altitude of about 11,000 miles with a period of about twelve hours. More than twenty-four satellites may be present as spares. These satellites are placed in six different orbits such that at any time a minimum of six satellites are visible at any location on the surface of the earth except in the polar region. Each satellite transmits a time and position signal referenced to an atomic clock. A typical GPS receiver locks on to this signal and extracts the data contained in it. Using signals from sufficient number of satellites, a GPS receiver can calculate its position, velocity, altitude, and time.

The GPS receivers can acquire signals in many modes. In a "hot start" mode, the receiver already has the time, its last position, and the information on satellite position (also known in the art as almanacs or ephemeris) stored in its memory. The receiver can use this stored information to determine which satellites are probably visible, and it can then lock on to those satellite signals in a short time. On the other hand, the receiver may have no prior data on its position, time, or almanacs stored. In this "cold start" mode, the receiver has to search for signals from all of the satellites present in the constellation. There are some other modes where partial information on time, position and almanacs are available and corresponding start mode is known as "warm start."

The GPS receiver has to acquire and lock on to at least four satellites in order to derive the position, velocity and time. Usually, a GPS receiver has many parallel channels, each receiving signals from a separate visible GPS satellite. The acquisition of the satellite signals involves a two-dimensional search of frequency and the PRN code phase. Each satellite transmits a unique PRN code, which repeats every millisecond. The receiver locally generates a replica frequency and a replica code phase and correlates these with the received satellite signals. The PRN code has to be searched in at least 2046 phases and the frequency search depends upon the Doppler frequency due to relative motion between the satellite and the receiver. Additional frequency variation may result due to local oscillator instability.

When the satellite signal is strong the receiver can detect the presence of a satellite signal in a short time. But when the signal is weak a long signal correlation is needed and the integration or correlation needs to be coherent which requires large computation load. The Signals may be weak due to an obstruction by foliage or buildings, or indoor operation. Special techniques are required to acquire the signal under these weak signal power conditions. One of the more widely used techniques under these conditions is known as assisted GPS (AGPS). In this method a cellular base station or server provides the ephemeris, time and data bit edge position to the GPS receiver in the cell phone so that it may acquire the satellite signal. This technique requires synchronization with the base station or server, and the service has to be provided by the cell phone operator. Consequently, it results in extra subscription charges and base station augmentation.

Due to the disadvantages with AGPS, it is desirable to be able to acquire weak GPS signals without outside assistance. Examples of this approach are disclosed in US Pat. Nos. 5271034, 6392590, and 6611756. Most of these techniques, however, are not suitable when the signal is extremely weak due to the large computation involved in carrying out lengthy integrations and fast Fourier transforms (FFTs). In these techniques, the integration involves the summing of one-millisecond correlation values. A correlation value is obtained by comparing the sample values of input signal with locally available PRN code samples over a one-millisecond interval. The difference between the agreement and disagreement of the sample values is this correlation value. In the case of perfect correlation and no noise, the correlation value is equal to the number of samples in the one millisecond length, e.g., if the number of samples per code-length in one millisecond is 2046, then the perfect correlation value is 2046. But if the codes are not aligned this value may be −130 or +126 or −2. Thus, in this case the detection of the received signal can be determined easily. In the presence of noise, however, the correlation value may not be 2046, but may have a lower value, and when the signal is extremely weak it may not be able to determine the correct correlation. In these circumstances, the receiver can estimate the correlation value over several consecutive milliseconds to arrive at a reasonable value.

This summing up over several milliseconds is also known as coherent integration. The coherent integration, however, requires that there are no sample reversals due to the residual carrier frequency. If there are reversals due to carrier frequency, the correlations may be carried out over non-reversed parts of the sample lengths and may be added by squaring each part. This is known as non-coherent integration. Compared to non-coherent integration, coherent integration provides better results for the same integration length. To boost the weak signal power, long time integration is necessary.

Once the satellite signal has been acquired, it is necessary to lock on to the signal by closely following the variations of the signal characteristics, which process is also known as tracking the signal. A receiver may fail to track an acquired signal due to reasons such as significant drop in the signal power, or a variation in the carrier frequency caused by satellite Doppler, local oscillator instability, or large platform dynamics.

In addition to tracking the signal, a GPS receiver also needs to demodulate navigation data modulated on top of the PRN code signal at a slower bit rate. The GPS $L_1$ signal is a code division multiple access (CDMA) signal which uses direct sequence to bi-phase modulate the carrier. The principal navigational signal $L_1$ is spread by C/A code. One-millisecond correlation with a locally generated corresponding pseudo-random noise (PRN) replica sequence is used for C/A code despreading. In addition to the C/A code, the GPS signal also includes supplementary navigational data modulated at 50 bits/second using bi-phase shift key (BPSK) modulation. In BPSK, bits 1 and 0 are indicated by carrier phase shifts of 0 degree and 180 degrees, respectively. This navigational data includes ephemeris and almanac data describing the satellite location, satellite health information, satellite clock bias, etc. Without this supplementary navigational information, correct user position and time cannot be determined. So it is necessary to demodulate this navigational data from received satellite signals.

However, in the case of weak signals, when coherent integration time is longer than one data bit duration (20 milliseconds), the signal might experience a sign inversion due to these data bits. This inversion, or data bit boundary, is characterized by the change in the polarity of the one-millisecond correlation values during an interval of 20 milliseconds or integer multiple of that interval. This reversal of the polarity of correlation values is the basis for estimating the edge of the data bit, or more specifically bit transitions, in the navigation signal. The process of determining the data bit edge, that is, the first millisecond of each 20-millisecond data bit, is called bit synchronization. It is not only necessary for long time coherent integration but also the first step of the navigational data demodulation. In addition, bit synchronization is the basis of pseudorange computation.

Under weak signal reception conditions, it is very difficult to get bit synchronization using known techniques, even at the cost of high computation load and time. Usually, an integration over 20 milliseconds, i.e., the length of the data bit, is carried out with all possible data bit edges at one millisecond interval. Then the computed maximum power determines the data bit edge.

From above it is clear that it would be an advance in the art to provide efficient methods to determine the bit edge for weak GPS signals.

SUMMARY OF THE INVENTION

Accordingly, the present invention provides methods of navigation data bit synchronization under weak satellite signals condition. In one aspect, the invention provides algorithms for data bit edge detection. In this data bit edge detection, one embodiment uses a summation of normalized dot products of the two consecutive one-millisecond correlation values, including both in-phase and quadrature components. Each set for summation are at a distance of one-bit duration (e.g., 20 milliseconds in GPS). These dot products are summed and compared with a predefined threshold to declare successful bit edge detection. In another embodiment, the bit edge detection is done by summing the powers of two-millisecond coherent integration associated with two adjacent samples. The powers due to these integrations at distance of one-bit duration (e.g., 20 milliseconds in GPS) are added together and compared with a threshold to determine the bit edge. The number of data bits considered for bit edge detection is increased until reliable results are obtained.

DETAILED DESCRIPTION

Figure 1:
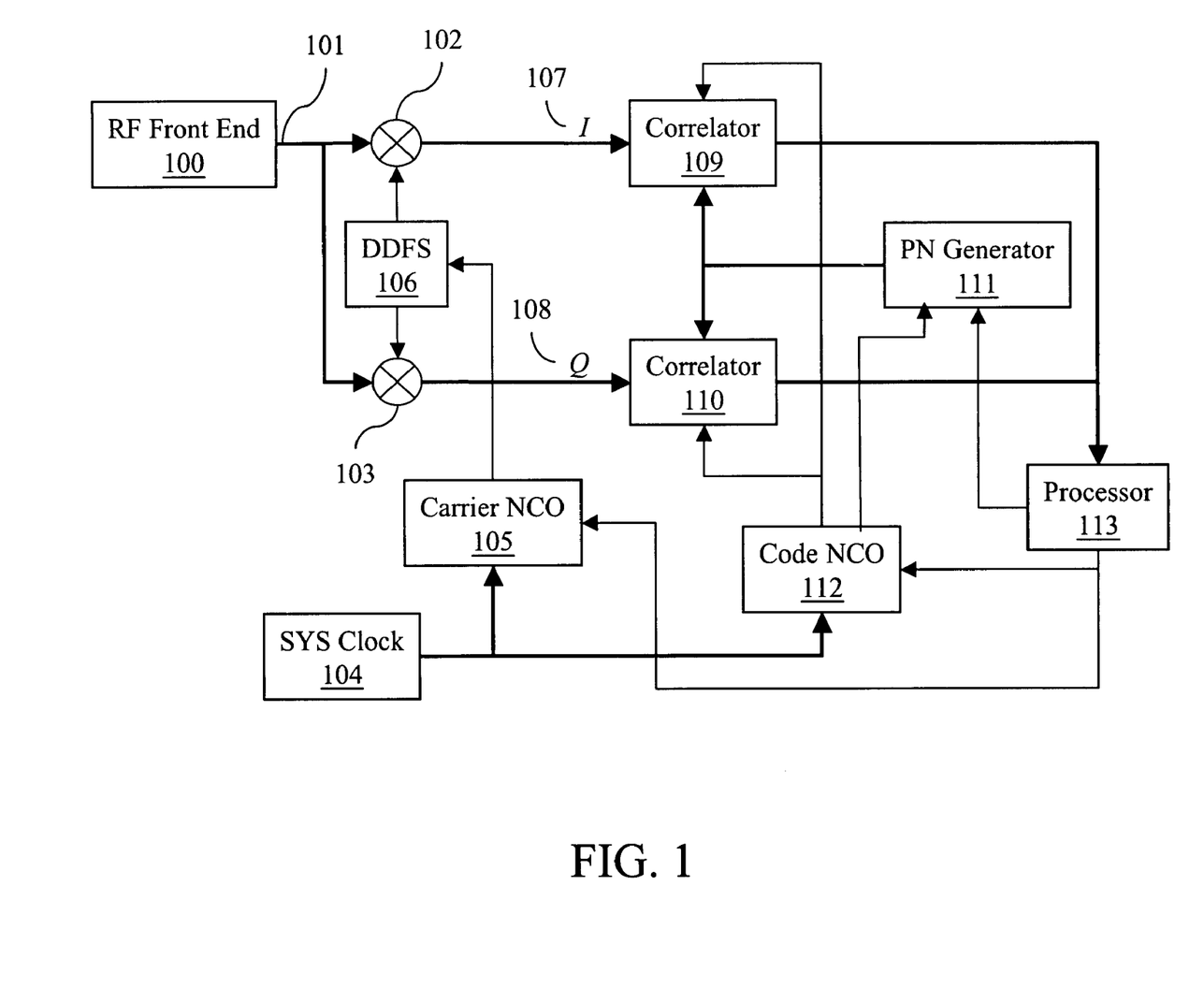
FIG. 1 is a block diagram illustrating a GPS receiver according to an embodiment of the present invention.

A preferred embodiment of a receiver according to the present invention is illustrated in FIG. 1. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase (I) component 107. In a parallel path the same signal 101 is multiplied by the DDFS frequency in quadrature (i.e., with a phase shift of 90 degrees) to produce quadrature (Q) component 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of ADC output 101. Thus the I and Q signals produced by the IF mixers 102 and 103 are near zero carrier frequency. The I and Q signals may be low-pass filtered to remove the high frequency components which are equal to twice the IF frequency band.

The I and Q components 107 and 108 are correlated in correlators 109 and 110, respectively, with a locally-generated PRN sequence generated by a PRN generator 111. The PRN-sequence corresponds to the channel being processed by the baseband section at that time. The PRN sequence generator is driven by code NCO 112. The local code generator frequency is made equal to the code rate of I and Q paths by corrective feedback from processor 113 to the code NCO 112. In addition, processor 113 sends a signal to PRN code generator 111 to set the starting phase of the locally generated code. The NCO 112 provides the correct clock signals to correlators 109 and 110. For example, NCO 112 provides a clock signal to generate two samples per PRN chip in the signal acquisition stage and three samples per chip during the tracking stage. SYS CLK 104 provides to NCO 105 and NCO 112 a common clock synchronization signal. The correlator output values are then sent to processor 113 at every millisecond interval. The processor 113 may be a digital signal processor (DSP) core. Subsequent processing of the signals take place in the processor 113, as will be described in detail below. Additional details of the receiver baseband section described above are contained in U.S. patent application Ser. No. 11/123,861 filed May 6, 2005, which is incorporated herein by reference. The DSP core 113 receives one millisecond integrated (correlated) I and Q values from the GPS baseband section described above. In order to acquire a GPS signal in the DSP processor, all dwells (set of carrier frequency and code phase) are searched. It is a two-dimensional search. Coherent integration and non-coherent integration are two commonly used integration methods to acquire GPS signals. Coherent integration provides better signal gain at the cost of larger computational load, for equal integration times.

The power associated with non-coherent integration of N milliseconds with one millisecond coherent integration is $$\text{Power} = \sum_{n=0}^{N-1} (I(n)^2 + Q(n)^2) \qquad (1)$$

and the power associated with coherent integration is $$\text{Power} = \left(\sum_{n=0}^{N-1} I(n)\right)^2 + \left(\sum_{n=0}^{N-1} Q(n)\right)^2 \qquad (2)$$

where I(n) and Q(n) denote the one-millisecond integration values from the baseband section at interval n, and N denotes the desired number of one-millisecond integration intervals. For coherent integration, the valid frequency bandwidth is narrowed so the frequency step is smaller than in non-coherent integration, which means that there are more frequency bins to search when using coherent integration. One method to mitigate this impact is to use an FFT method for coherent integration so that more frequency bins can be checked at a time. However, one additional parameter (i.e., bit edge) needs to be detected, especially for coherent integration over extended periods of time. Thus, when used as it is, this FFT based method results in increased computational load. A multi-step acquisition scheme consisting of coarse acquisition and fine acquisition may be employed to reduce the computational load.

Once the signal has been acquired, it is necessary to maintain the lock between the local replica signal and the input signal and also extract the navigational data bits. This means the local signal should track the frequency variations of the incoming signal with negligible carrier and local oscillator frequency difference. During this tracking stage, the navigation data bit synchronization may be achieved. The data bit edge is aligned with the one-millisecond long PRN sequence. So, in most of the cases, a data bit transition may be found within twenty milliseconds unless the consecutive data bits have the same polarity (i.e., two consecutive bits are 0 or two consecutive bits are 1). The result of coherent integration over the twenty milliseconds will have maximum power when there is no data bit transition within the twenty milliseconds. If there is a bit transition afterwards, the power will suddenly decrease because the change in the polarity of the data bit results in a sign inversion of received signal samples. But when the signal is weak, 20 milliseconds integration might not boost signal power to a strong enough level, that is, the peak power might not be obvious, due to noise. Thus, computation extending over several data bits has to be carried out to make a reliable bit edge decision. Knowledge of bit boundary is required to compute long coherent integration and also to extract navigational data from the modulated signals. In the present invention, techniques of bit synchronization, that is, data bit edge detection, are given.

The present techniques are designed for GPS receivers operating in situations where aiding information to indicate bit edge is neither available from outside nor can be estimated based on receiver position, time, and other known satellites. Two methods disclosed here may be used to detect the bit edge.

These bit synchronization methods are:

1. Bit edge detection based on dot product summation.

2. Bit edge detection based on two-millisecond coherent integration powers summation.

The first method is based on summation of dot products of two consecutive one-millisecond in-phase and quadrature correlations with each summation set at an interval of 20 milliseconds.

In the GPS receiver embodiment shown in FIG. 1, the GPS baseband unit outputs one-millisecond I(n) and Q(n) correlation values which are the real and imaginary parts of a complex correlation value s(n) defined by $$s(n)=I(n)+iQ(n) \quad (3)$$

where i is the imaginary unit. The correlation value s(n) may be equivalently represented as s(n)=s(20k+j), where k is the data bit index and j ($0 \leq j < 20$) is a millisecond index within one-bit duration. The duration of one GPS navigational data bit is 20 milliseconds. The data bit transition might occur at any millisecond.

Figure 2:
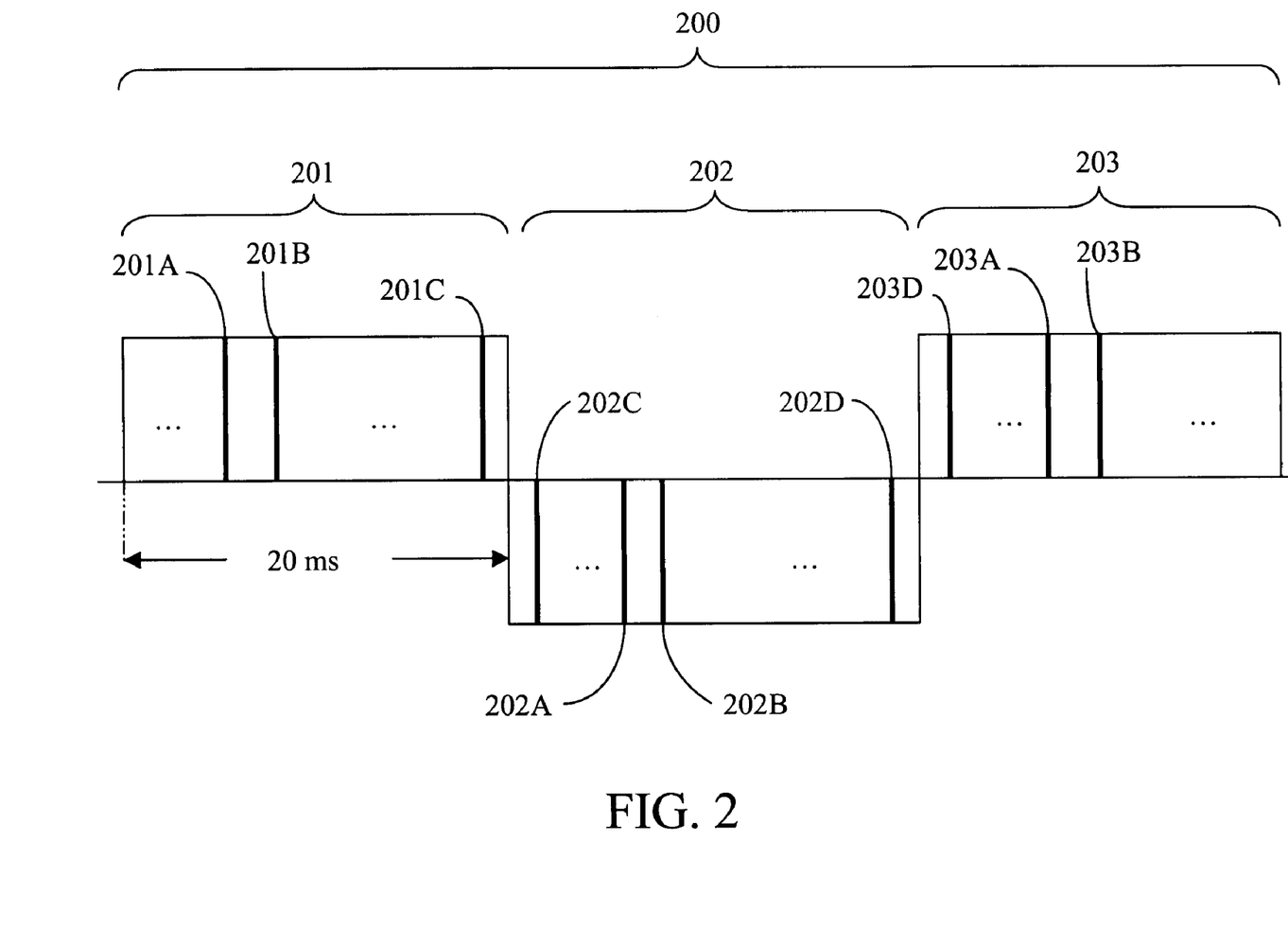
FIG. 2 illustrates a dot product algorithm to detect the data bit edge according to an embodiment of the present invention.
Figure 3:
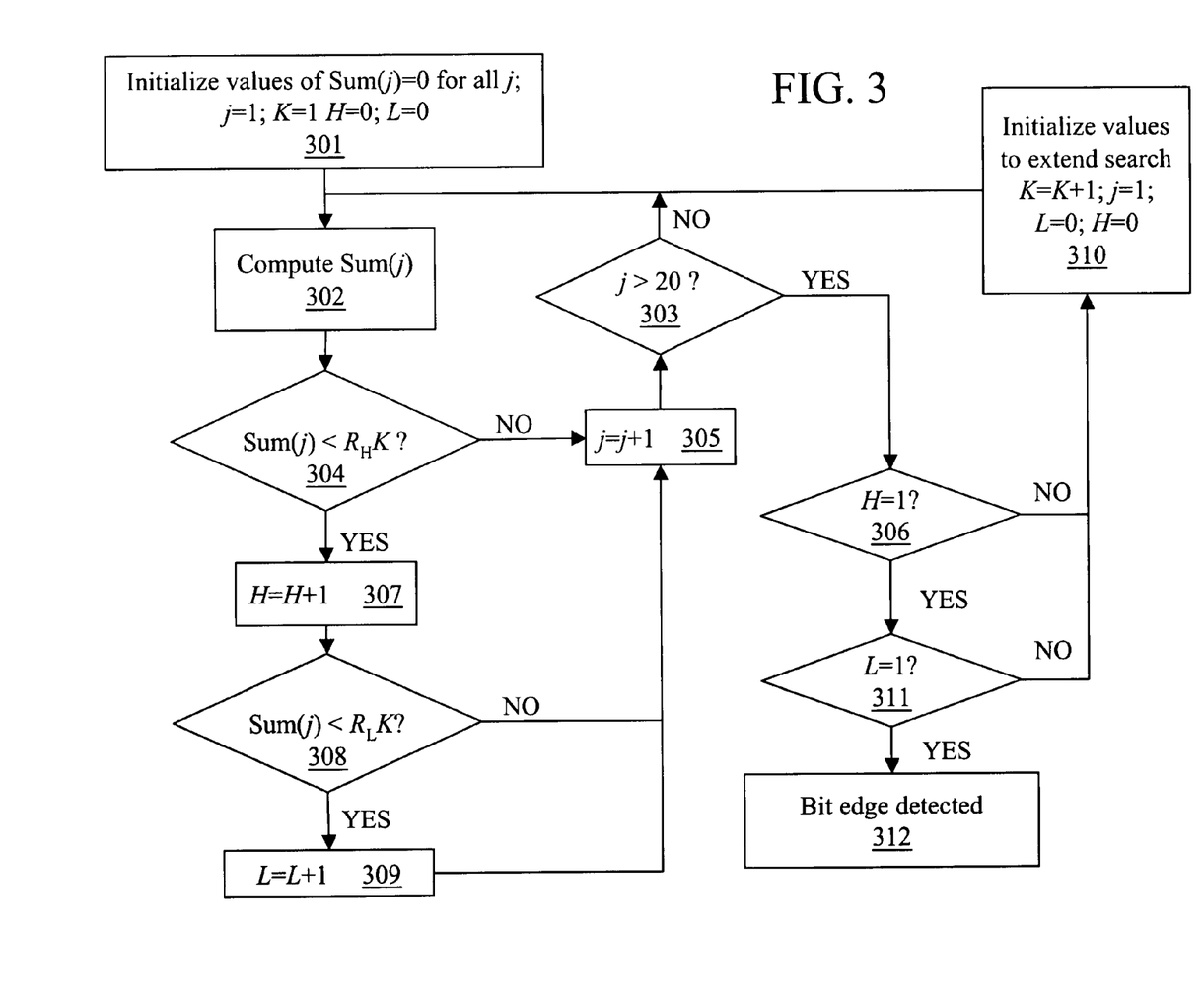
FIG. 3 is the flowchart of a dot product algorithm to detect the data bit edge according to an embodiment of the present invention.

If two adjacent correlation values s(n−1) and s(n) are on different sides of a bit boundary, and the polarities of these two adjacent bits are different, the dot product of these two adjacent correlation values is a negative value, i.e., s(n−1)·s(n)<0. Otherwise, the dot product results in a positive value, i.e., s(n−1)·s(n)>0. FIG. 2 illustrates the basis of this algorithm while FIG. 3 is a flowchart of this process. This algorithm may be illustrated in three steps as given below.

STEP 1:

Compute the normalized dot product of a pair of adjacent normalized correlation values:

$$\hat{s}(n-1) \cdot \hat{s}(n) = \frac{s(n-1)}{|s(n-1)|} \cdot \frac{s(n)}{|s(n)|} \quad (4)$$
$$= \frac{I(n-1)I(n) + Q(n-1)Q(n)}{\sqrt{I(n-1)^2 + Q(n-1)^2}\sqrt{I(n)^2 + Q(n)^2}}$$

The normalization is used to minimize effects due to the large variation of signal strength. In the FIG. 2, 200 is a sequence of 60 one-millisecond correlation values with associated data bits. In this figure, 201, 202 and 203 are the three 20-millisecond navigation data bits, which are assumed to have polarities of positive, negative, and positive, respectively. Thus, data bit transitions are present between these three data bits. Adjacent correlation values 201A and 201B within data bit 201 are not at the bit edge and produce a dot product whose value is positive. Similarly, the two samples 202A and 202B which are at a distance of 20 milliseconds from 201A and 201B, as well as the two samples 203A and 203B which are at a distance of 40 milliseconds from 201A and 201B, also result in positive dot products. So the summation of the normalized dot products of these three pairs of consecutive correlation values results in a large positive value because these pairs of adjacent correlation values do not cross data bit transition boundaries. This is in contrast to the two correlation values 201C and 202C, which span the first data bit boundary, and the two correlation values 202D and 203D, which span the second data bit boundary. Because correlation values 201C and 202C have dissimilar polarities, they generate a negative dot product. Similarly, because correlation values 202D and 203D have dissimilar polarities, they also generate a negative dot product. Thus, the summation of normalized dot products of these pairs of adjacent correlation values results in a large negative value. This summation is illustrated in step 2 below.

STEP 2:

For each of the 20 possible bit transition positions, j, compute the sum of the normalized dot products of data bit pairs at those positions:

$$\text{Sum}(j) = \sum_{k=0}^{K-1} \hat{s}(20k+j-1) \cdot \hat{s}(20k+j) \quad (5)$$

where K is the total number of data bits considered in the sum. Because in this case there is no prior knowledge of the data bit boundary, every millisecond within the one-bit duration (20 milliseconds) has equal probability to be the bit edge. The number K may be increased until there is a reliable bit edge detection. The step 302 of flowchart in FIG. 3 represents this summation operation. A step 301 before 302 sets initial values for the loop.

STEP 3:

In this step, for all 20 values of the index j, the value of Sum(j) is compared with a high threshold value $R_H K$, and possibly also with a low threshold value $R_L K$, as shown in logic steps 304 and 308 of FIG. 3, where $R_H$ and $R_L$ are predetermined constants. For each index j for which Sum(j) <$R_H K$, the value of a high threshold counter H is increased. If, in addition, Sum(j)<$R_L K$, then value of a low threshold counter L is also increased, as shown in blocks 307 and 309, respectively. Block 305 increases the index j and 303 checks whether all indices have been handled. After all 20 values of j are compared with the thresholds, block 306 checks if H=1, i.e., if Sum(j)<$R_H K$ for only one value of j. If this test fails, then there were multiple possible bit edge positions, or none. Since no unique bit edge was detected, the bit edge search is then extended to another data bit by increasing K by 1 and continuing the search, as shown in the block 310. If H=1, however, then block 311 checks further if L=1, i.e., if Sum(j) <$R_L K$ for exactly one value of j. If this test fails, then no bit edge satisfied the lower threshold test, and the search is extended at block 310. If L=1, however, a detection of bit edge is confirmed, as shown in block 312. This step of the algorithm ensures that the detected bit edge is below the lower threshold and it is the only possible bit edge below the higher threshold. The predetermined values of $R_H$ and $R_L$ may be selected based on the signal to noise ratio and the probability of false bit edge determination. Typical values may be $R_H$=0.20 and $R_L$=0.08.

In this method, the polarity of the data bit sign is not based on a hard decision (i.e., a two value decision, where +1 corresponds to a positive sign while −1 corresponds to a negative sign, or always deciding the bit sign to be +1 or −1 without giving weight to the actual amplitude). Instead, the present method is based on a soft decision. The value of a sensed data bit sign can be any real value between −1 and +1, which is equal to the normalized dot product. In particular, the absolute value corresponds to the probability that the bit sign is a positive sign or a negative sign. The use of soft decision in data bit sign estimation has the advantage that it resists the disturbance of noise compared with hard decision.

Figure 4:
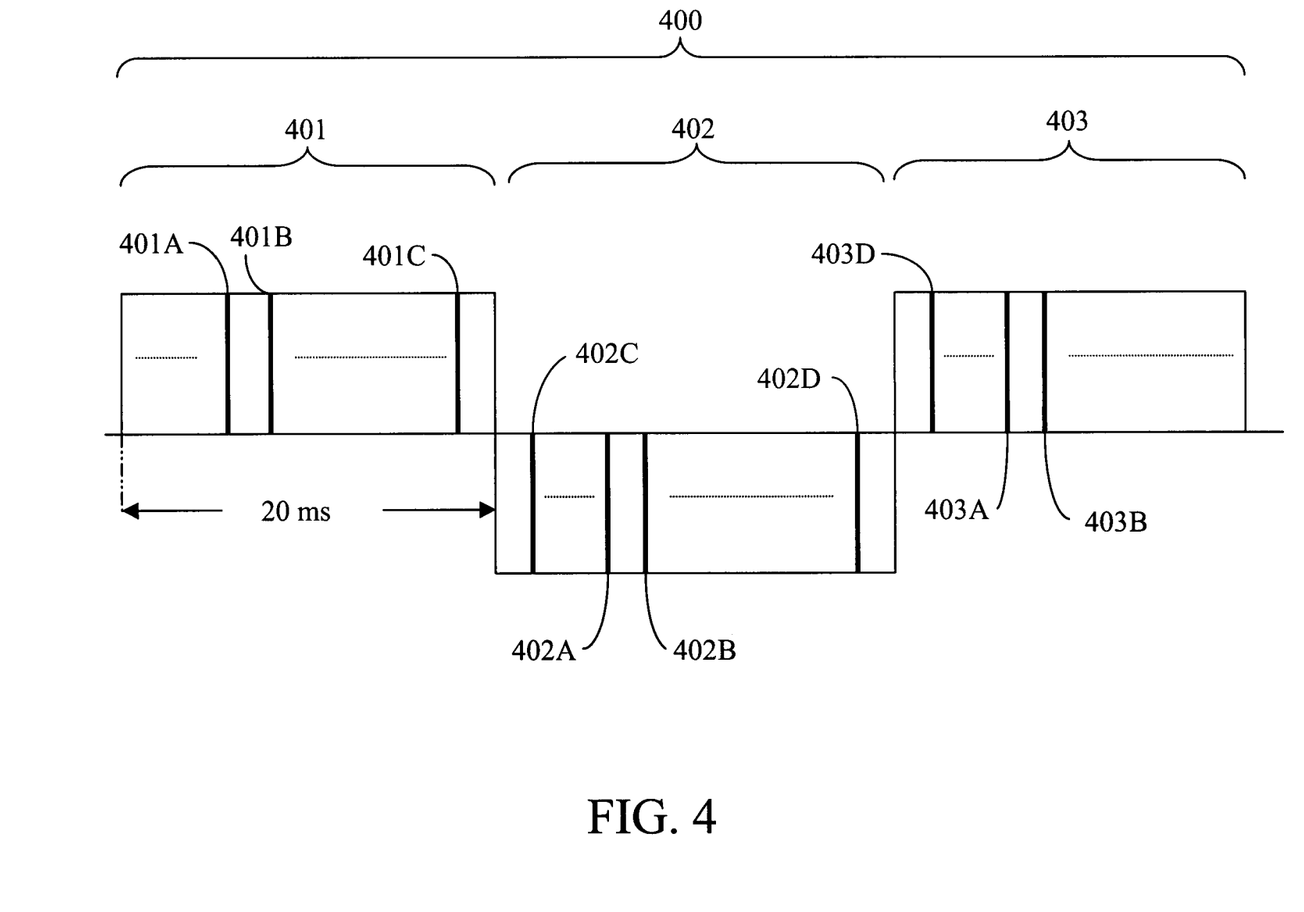
FIG. 4 illustrates a data bit edge detection technique based on two millisecond coherent integration according to an embodiment of the present invention.

Another exemplary embodiment is based on the fact that if the adjacent correlation values s(n−1) and s(n) are on either side of a data bit boundary and the polarities of these two adjacent bits are different, then the adjacent correlation values s(n−1) and s(n) will have opposite polarity and result in a smaller coherent integration power compared with the those of two samples with the same polarity. Thus, instead of taking the dot product of adjacent correlation value pairs, this technique computes the coherent integration power of adjacent correlation value pairs. These two techniques are thus particular instances of a technique where a function F is calculated from the adjacent pairs of correlation values, and then the calculated values of F are added to produce a SumF value for each possible data bit edge position j. In one embodiment, the function F is the dot product, while in another the function F is the coherent integration power. Those skilled in the art will appreciate that various other functions F may be used, and that the technique is not necessarily limited to these two examples. FIG. 4, which is similar to FIG. 2, illustrates the concept involved with this second exemplary embodiment, while FIG. 5, which is similar to FIG. 3, is the flowchart of the process. This algorithm is implemented as the following three steps.

STEP 1:

Compute the coherent integration power of adjacent correlation values s(n−1) and s(n):

$$\text{Power}(n)=|s(n-1)+s(n)|^2=[I(n-1)+I(n)]^2+[Q(n-1)+Q(n)]^2 \qquad (6)$$

In FIG. 4, a signal sequence 400 contains three data bits shown as 401, 402, and 403. Within the first data bit 401 are two adjacent correlation values 401A and 401B. Similarly, values 402A and 402B are the two corresponding adjacent samples in the next data bit 402, and values 403A and 403B are the two corresponding adjacent samples in the third data bit 403. These adjacent correlation values are all positioned within the data bit, so the two values in each pair have same polarity, i.e., either positive as in the case of 401A and 401B or negative as in 402A and 402B. On the other hand, the adjacent correlation values 401C and 402C are placed on either side of the bit edge and so have different polarities. Similarly, the correlation values 402D and 403D also have different polarities. In FIG. 4 the data stream 400 may be either I or Q.

Figure 5:
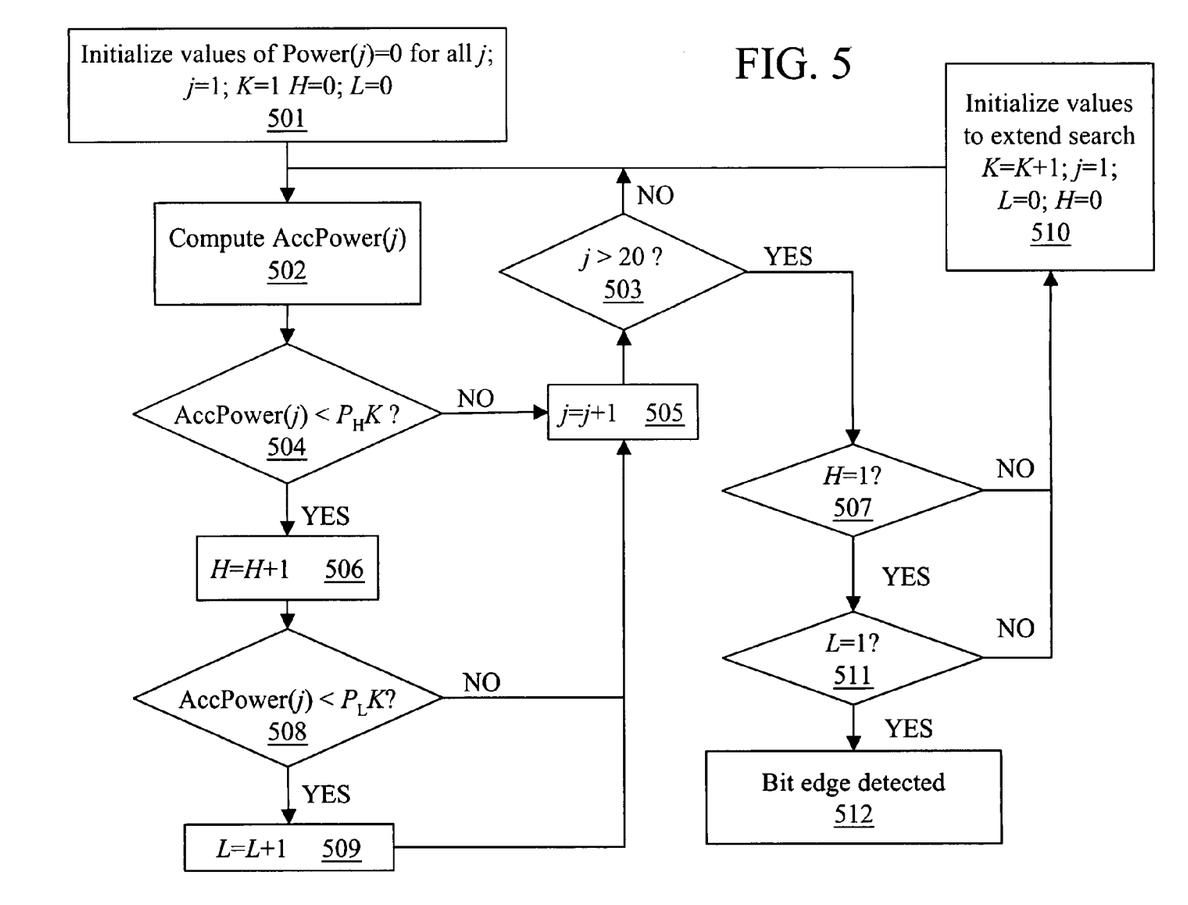
FIG. 5 is the flowchart of a data bit edge detection technique based on two millisecond coherent integration according to an embodiment of the present invention.

STEP 2:

For each of the 20 possible bit transition positions,j, calculate an accumulated coherent integration power value, AccPower(j):

$$\text{AccPower}(j) = \sum_{k=0}^{K-1} \text{Power}(20\,k + j) \qquad (7)$$

where K is the total number of data bits considered in the sum. The block 502 in FIG. 5 represents this power accumulation calculation. A step 501 before 502 initializes the loop through all 20 values of index j, as controlled by blocks 503 and 505.

STEP 3:

For each value of j, the AccPower(j) value is compared with predetermined high and low power threshold values $P_H K$ and $P_L K$, as shown in steps 504 and 508. Counters H and L are increased in blocks 506 and 509 if the conditions are satisfied. When all values of j have been tested, H represents the number of bit edge positions j for which AccPower(j)<$P_H K$ and L represents the number of bit edge positions j for which AccPower(j)<$P_L K$. After the loop checks all 20 values of j, decision blocks 507 and 511 check the values of H and L to determine whether or not a bit edge can be detected. If there is only one bit edge position j such that AccPower(j) is below the high threshold, and AccPower(j) is also below the low threshold, then a bit edge detection is confirmed at position j, as shown in block 512. Otherwise, no bit edge is detected and the search is extended to the next data bit at block 510 by increasing K and repeating the loop. Thus, the detected bit edge is below the lower threshold and it is the only bit edge below the higher threshold. The predetermined values of RH and RL may be selected based on the signal to noise ratio and the probability of the false bit edge determination. In addition, these values are also preferably selected to be proportional to the average coherent integration power of two milliseconds adjacent signals with same polarity.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems and also to any type direct sequence spread spectrum receivers. Accordingly, it is intended that the appended claims be interpreted as covering all alterations and modifications as fall within the spirit and scope of the invention.

The invention claimed is:

1. A method implemented in a satellite navigation receiver for navigation data bit synchronization in the signals received from navigational satellites, the method comprising:
   collecting correlation values over several consecutive data bits;
   calculating, for each of a plurality of pairs of adjacent correlation values having a common data bit position j within the several consecutive data bits, a function F(j), wherein the function F(j) is a normalized dot product of the adjacent correlation values having a common navigational data bit position j;
   adding the values of F(j) calculated for the plurality of pairs to produce a value SumF(j);
   repeating the calculating and adding for multiple values of the data bit position j to produce a collection of values {SumF(j)} corresponding to the multiple values of the data bit position j;
   comparing each value of SumF(j) to a lower threshold and a higher threshold; and
   using a soft decision approach based on SumF(j) to detect a navigational data bit edge, wherein the soft decision approach includes using a real value of F(j) varying between −1 and +1.

2. The method of claim 1, wherein the step of using the soft decision approach further includes detecting a navigational data bit edge at a bit position i if SumF(j) for j=i is less than the lower threshold and SumF(j) for j≠i is greater than the higher threshold.

3. The method of claim 1 wherein the function F(j) is a coherent integration of the adjacent correlation values having a common data bit position j.

4. The method of claim 3 wherein the lower threshold and the higher thresholds are proportional to an average coherent integration power of two milliseconds adjacent correlation values with same polarity.

5. The method of claim 1 wherein the lower threshold and the higher threshold are determined based on the signal-to-noise ratio of the collected correlation values.

6. The method of claim 1 wherein the lower threshold and the higher threshold are functions of the probability of false bit edge detection.

7. A satellite navigation receiver device comprising an RF front end for receiving signals from navigation satellites, a baseband section receiving IF signals from the RF front end and generating one-millisecond correlation values, and a processor receiving correlation values from the baseband section, wherein the processor performs navigation data bit synchronization by:
   collecting the correlation values over several consecutive data bits;
   calculating, for each of a plurality of pairs of adjacent correlation values having a common data bit position j within the several consecutive data bits, a function F(j), wherein the function F(j) is a normalized dot product of the adjacent correlation values having a common data bit position j;
   adding the values of F(j) calculated for the plurality of pairs to produce a value SumF(j);
   repeating the calculating and adding for multiple values of the data bit position j to produce a collection of values {SumF(j)} corresponding to the multiple values of the data bit position j;
   comparing each value of SumF(j) to a lower threshold and a higher threshold; and
   using a soft decision approach based on SumF(j) to detect a navigational data bit edge, wherein the soft decision approach includes using a real value of F(j) varying between −1 and +1.

8. The device of claim 7, wherein using the soft decision approach further includes detecting a navigational data bit edge at a bit position i if SumF(j) for j=i is less than the lower threshold and SumF(j) for j≠i is greater than the higher threshold.

9. The device of claim 7 wherein the function F(j) is a coherent integration of the adjacent correlation values having a common data bit position j.

10. The device of claim 9 wherein the lower threshold and the higher thresholds are proportional to an average coherent integration power of two milliseconds adjacent correlation values with same polarity.

11. The device of claim 7 wherein the lower threshold and the higher threshold are determined based on the signal-to-noise ratio of the collected correlation values.

12. The device of claim 7 wherein the lower threshold and the higher threshold are functions of the probability of false bit edge detection.

13. The method of claim 1 wherein the lower threshold and the higher threshold are each calculated based on a total number of data bits used to compute the SumF(j).

14. The device of claim 7 wherein the lower threshold and the higher threshold are each calculated based on a total number of data bits used to compute the SumF(j).

15. The method of claim 1 wherein the lower threshold is calculated based on a first predetermined constant and the higher threshold is calculated based on a second predetermined constant.

16. The device of claim 7 wherein the lower threshold is calculated based on a first predetermined constant and the higher threshold is calculated based on a second predetermined constant.

17. A method implemented in a satellite navigation receiver for navigation data bit synchronization in the signals received from navigational satellites, the method comprising:
   collecting, at the satellite navigation receiver, correlation values over several consecutive data bits;
   calculating, for each of a plurality of pairs of adjacent correlation values having a common data bit position j within the several consecutive data bits, a function F(j), wherein the function F(j) is a coherent integration power value having a common data bit position j;
   adding the values of F(j) calculated for the plurality of pairs to produce a value AccF(j);
   repeating the calculating and adding for multiple values of the data bit position j to produce a collection of values {AccF(j)} corresponding to the multiple values of the data bit position j;
   comparing each value of AccF(j) to a lower threshold and a higher threshold; and
   using a soft decision approach based on SumF(j) to detect a navigational data bit edge, wherein the soft decision approach includes using a real value of F(j) varying between −1 and +1.

18. The method of claim 17 wherein the lower threshold and the higher threshold are determined based on the signal-to-noise ratio of the collected correlation values.

19. The method of claim 17 wherein the lower threshold and the higher threshold are functions of the probability of false bit edge detection.

20. The method of claim 17 wherein the lower threshold and the higher thresholds are proportional to an average coherent integration power of two milliseconds adjacent correlation values with same polarity.

21. The method of claim 17, wherein the step of using the soft decision approach further includes detecting a navigational data bit edge at a bit position i if SumF(j) for j=i is less than the lower threshold and SumF(j) for j≠i is greater than the higher threshold.

* * * * *